H. D. MOISE.
FLUSHING APPARATUS FOR CLOSETS, &c.
APPLICATION FILED MAR. 22, 1909.
965,479.
Patented July 26, 1910.
4 SHEETS—SHEET 2.
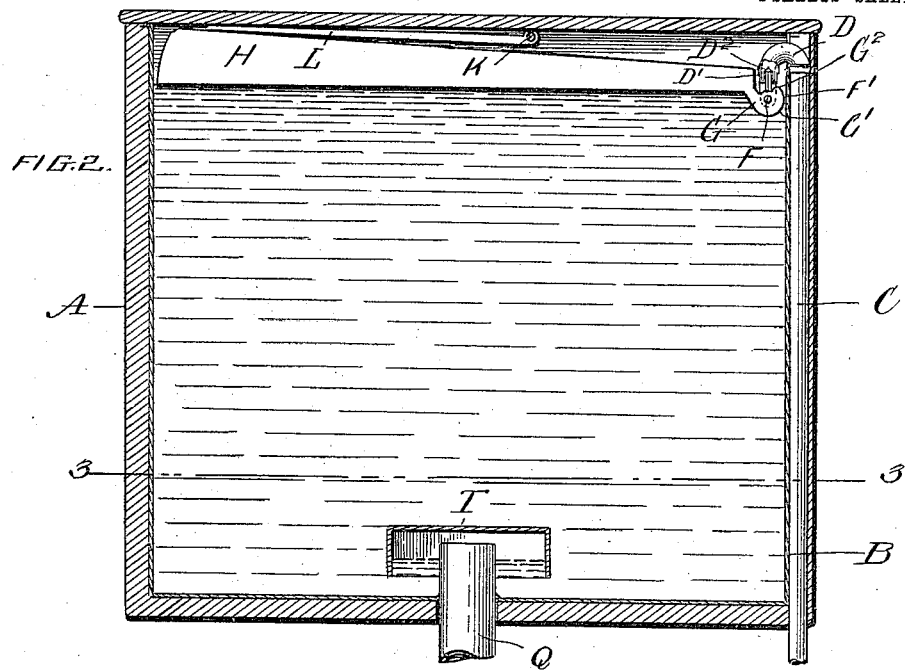
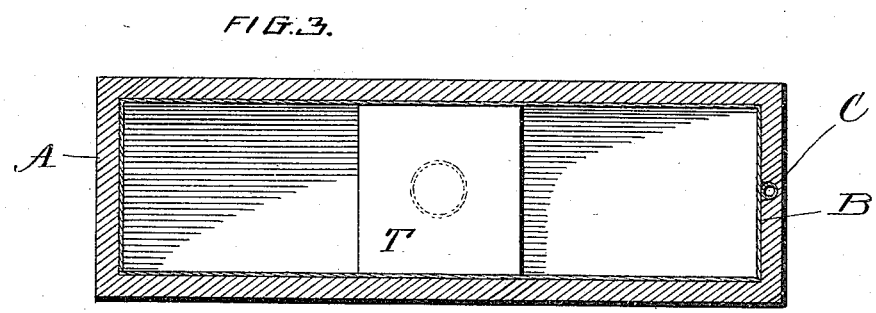
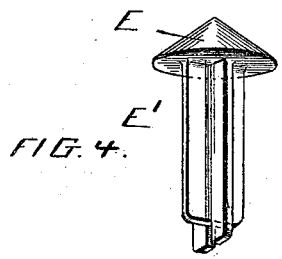
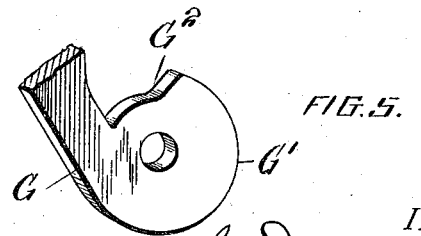
WITNESSES:
INVENTOR
H. D. Moise,
BY Franklin H. Hough
Attorney

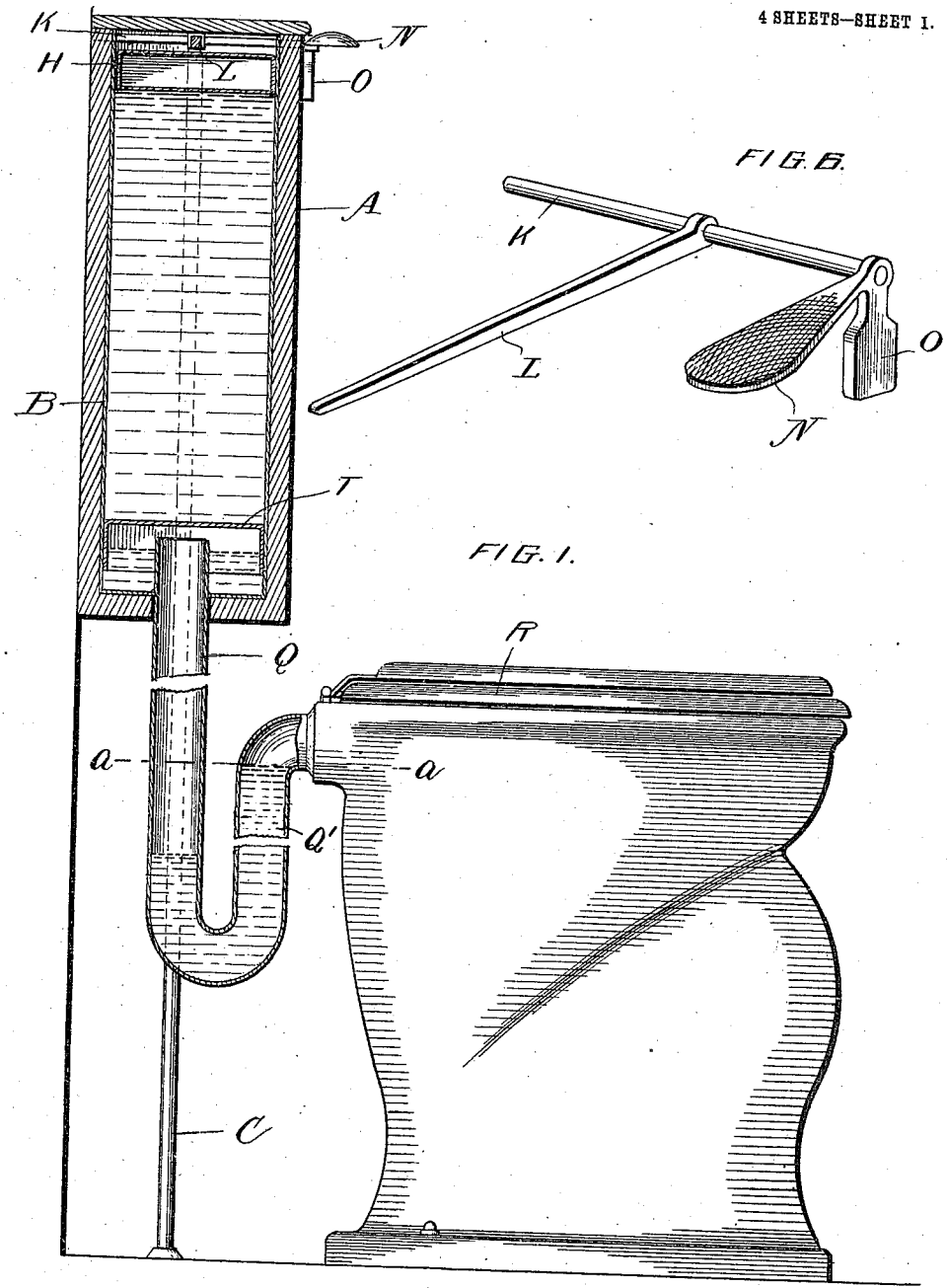

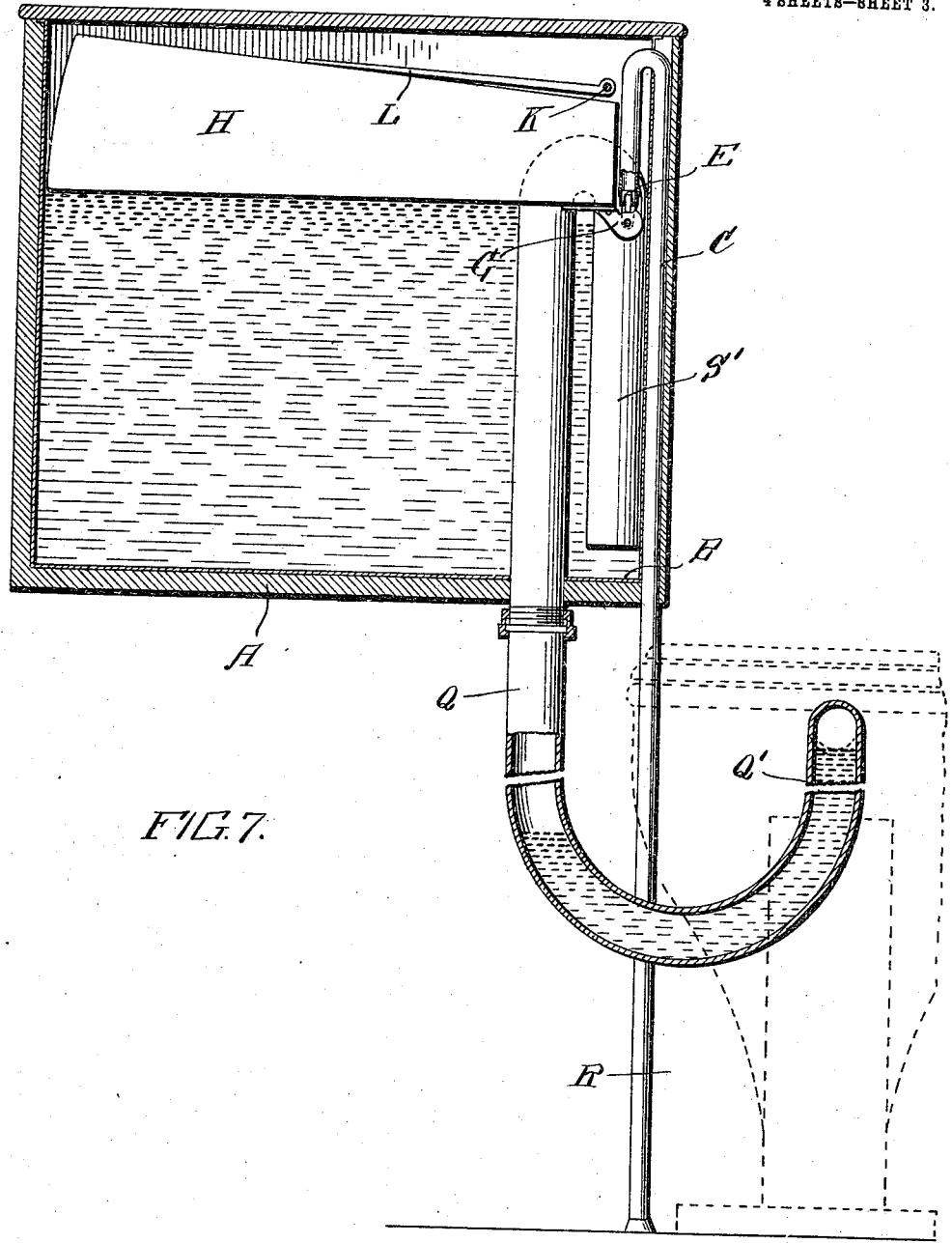

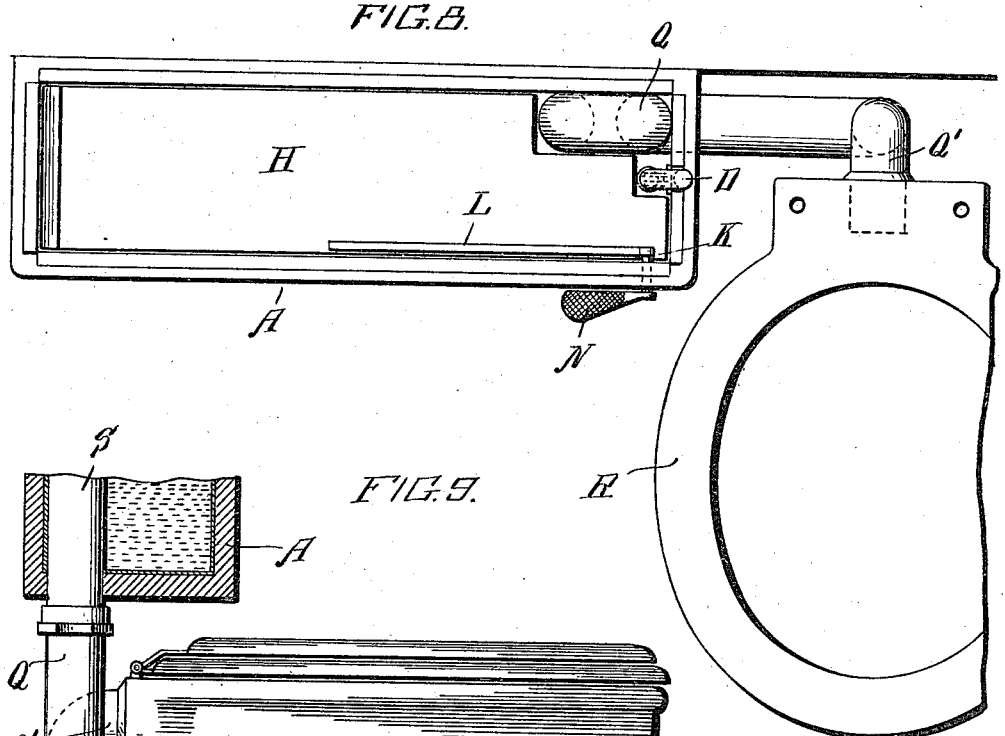
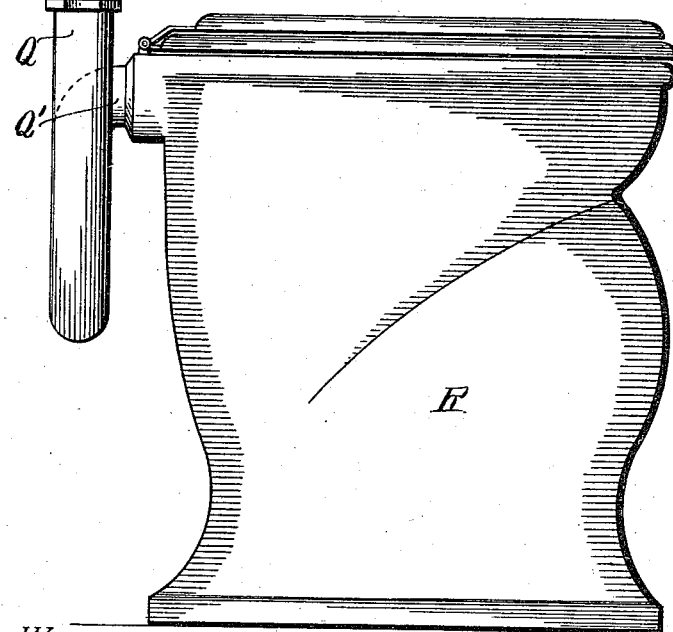

UNITED STATES PATENT OFFICE.

HARMON D. MOISE, OF SUMTER, SOUTH CAROLINA, ASSIGNOR TO THE VALVELESS FLUSH-TANK COMPANY, OF SUMTER, SOUTH CAROLINA.

FLUSHING APPARATUS FOR CLOSETS, &c.

965,479.  Specification of Letters Patent.  Patented July 26, 1910.

Application filed March 22, 1909. Serial No. 485,069.

*To all whom it may concern:*

Be it known that I, HARMON D. MOISE, a citizen of the United States, residing at Sumter, in the county of Sumter and State of South Carolina, have invented certain new and useful Improvements in Flushing Apparatus for Closets, &c.; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention comprises a flush tank apparatus containing means so arranged that, when a tank is emptied and the siphon breaks, air will be trapped within and about the upper open end of the long arm of the siphon and thus prevent further discharge of water from the tank until means is actuated, causing the air to be released from the trap, thus overcoming the pressure within the air trap and allowing the water to discharge.

The invention relates further to new and useful improvements in flushing tanks and comprises means whereby the pressure of water, as it rises within the tank after having been emptied, will cause a sufficient pressure upon the column of air and water trapped within the discharge tube to force an after-flow.

The invention comprises various details of construction, combinations and arrangements of parts which will be hereinafter fully described and then specifically defined in the appended claims.

I illustrate my invention in the accompanying drawings, in which:—

Figure 1 is a vertical sectional view through a low flush tank, trap, siphon and discharge tube leading therefrom and connected to a bowl shown in side elevation. Fig. 2 is a sectional view vertically and longitudinally through the flush tank. Fig. 3 is a horizontal sectional view on line 3—3 of Fig. 2. Fig. 4 is an enlarged detail view of a valve regulating the inflow pipe. Fig. 5 is an enlarged detail perspective view of a bracket member adapted to be fastened to a float and designed to unseat and hold the valve open. Fig. 6 is a detail perspective view showing a means for depressing the float. Fig. 7 is a vertical sectional view through a low tank showing a slight modification of my invention. Fig. 8 is a top plan view of the modified form shown in Fig. 7, and Fig. 9 is a vertical sectional view through a portion of the tank showing in edge elevation a portion of the modified form illustrated in Figs. 7 and 8.

Reference now being had to the details of the drawings by letter, A designates a low flush tank of the usual construction and is provided preferably with a suitable metallic lining B. An inlet pipe C passes through a channel or opening in one of the vertical walls of the tank outside the lining and its upper end has a semi-circular coupling D connected thereto which leads into the tank in the manner shown in Fig. 2 of the drawings. Fitted to the end of the coupling is a shell D' having a central boss $D^2$ about an opening therein, the upper end of said boss forming a seat for the valve E, a detail of which is shown in Fig. 4 of the drawings. Said valve has a stem E' made up of radially disposed wings in order to allow liquid to flow freely thereby when the valve is unseated. Pivotally mounted upon a pin F carried by projections F' upon said shell D' is a bracket arm G which is fastened to the float H. Said bracket arm has a vertically disposed disk-shaped end G' terminating in a shoulder $G^2$, which latter is adapted, as the float is depressed, to contact with the lower end of the stem of the valve to unseat the latter, after which upon further depression of the float said disk-shaped end will remain in contact with the lower end of the stem and serve to hold the valve unseated while the float is going down and until it returns to its normal level when the tank is again refilled, after which the valve will automatically close. Said float which is preferably hollow is adapted to substantially cover the entire surface of the liquid in the tank and has its forward free swinging end preferably of greater depth than its pivotal end.

Mounted in suitable bearings in the opposite walls of the tank is a shaft K, a detail of which is shown in Fig. 6 of the drawings, and which has fixed thereto a float depressing arm L and also a handle N, which latter is adapted to project over the top of the tank, as shown clearly in Fig. 1 of the drawings.

O is a counter-balancing member which is fixed to the shaft K and serves to hold the float depressing arm L from assuming a vertical position when the float is depressed and tending to return said arm to an inclined position so that, when the float rises toward its normal position, it will not interfere with its further upward movement but will rise with the float when the latter comes in contact therewith.

Leading through the bottom of the tank and the lining thereof is a tube having a long arm Q extending a slight distance above the bottom of the tank and its other end Q' extending into the bowl R where there is the usual trap to be filled by an after-flow, which latter in tanks as now constructed is usually fed into the bowl through independent means but which in my invention is dispensed with.

T designates a bell open at its lower end and fixed in place a slight distance above the bottom of the tank and inclosing the open end of the long arm Q of the tube, as shown clearly in the drawings, in order to allow a space in which air may be trapped.

In Figs. 7 to 9 inclusive, I have shown a slight modification of my invention in which I substitute for the submerged bell apparatus, shown in Figs. 1 and 2 of the drawings, a siphon extending to the top of the boiler at its normal height, the siphon being of goose neck form as illustrated or of any other desired form, the balance of the apparatus shown in the modified form being the same as before described and illustrated in Fig. 1 of the drawings.

In Fig. 7, the letter S designates the long leg of a siphon and S' the short leg, the former passing through the bottom of the tank and lining therefor and the crown of the siphon being positioned on the line of the surface of the liquid within the tank at its highest position. The lower end of the long leg of the siphon is connected by any suitable means to the long arm Q of the latter communicating with the bowl R in a similar manner as shown in Fig. 1 of the drawings with the exception that said discharge pipe is so positioned that the tank may be placed at one side of the bowl, thus allowing for an economical use of floor space.

In operation, when it is desired to flush the bowl, the operator, by depressing the handle N, may cause the shaft carrying said handle to rock and the arm L to bear against the upper surface of the float, which latter covers substantially the entire surface of the liquid. A downward pressure imparted to the float will have the effect of the force of a piston within a cylinder acting upon a fluid therein and such pressure, acting upon the trapped air, will cause the liquid to rise up over the top of the arm Q of the tube, it being understood that the discharge pipe, when first installed and before liquid is admitted to the tank, has its lower part below the line a, a charged with liquid. The moment the liquid begins to discharge through the tube Q', said liquid gives place to the trapped air which in turn is followed by the liquid in the tank until the siphon breaks. The moment the float is depressed, the shoulder upon the bracket arm to which the float is attached, coming in contact with the lower end of the valve stem, will cause the valve to unseat and remain open by the disk-like end of the bracket arm coming in contact with the end of the valve stem and remaining in such contact while the float is moving downward to its lowest position and also while returning to its normal position. When the tank has refilled and the float reaches its highest or normal position, the valve will automatically seat, thus cutting off the further supply of liquid. When the liquid within the tank lowers sufficiently so that the upper surface thereof will allow air to pass underneath the lower marginal edge of the bell T, the siphon will be broken and further discharge from the tank cut off. After the siphon has been broken, the liquid within the arms of the siphon will seek its level up to the line a, a (Fig. 1). As the tank refills with liquid and the pressure correspondingly increases against the trapped air, the pressure of liquid exerted upon the trapped air will, by pressing upon the liquid below the line a, a, cause an after-flow of the liquid remaining within the tube Q' to be forced over the line a, a and into the bowl, thereby sealing it. The normal pressure of the volume of liquid within the tank when filled will not be sufficient to compress the air within the trap enough to force the air from the trap and start the discharge of the tank. When it is desired to flush the bowl, it will be necessary to depress the float which bears against substantially the entire surface of the liquid within the tank and said depression will transmit to the liquid force which will in turn be transmitted to the trapped air and in turn again to the liquid below the line a, a (Fig. 1), causing the liquid to discharge through the tube Q', releasing the air following and permitting the discharge of the liquid in the tank.

The operation of the modified form shown and described does not differ from the operation as hereinbefore set forth excepting in this, that the discharge is effected by siphonic action from first to last, it being understood that the siphonic action of the liquid of the form of apparatus shown in Figs. 1 and 2 of the drawings does not commence until the surface of the water within the tank lowers to the level of the upper end of the long arm Q of the discharge pipe.

What I claim to be new is:—

1. A low down, air bound siphon flushing apparatus, and means for applying pressure to substantially the entire surface of the liquid to obtain a flushing action.

2. A low down, air bound siphon flushing apparatus, a float covering substantially the surface of the liquid contained within the tank and adapted when depressed to cause a flushing action.

3. A flushing apparatus comprising, in combination, a tank, an air bound siphon communicating therewith, a discharge pipe communicating with said siphon and comprising a liquid trap, automatic means for recharging the tank and for preventing the liquid from discharging from the tank and to obtain an after-flow of liquid from the discharge pipe after the tank has been discharged and during the operation of refilling the tank, and float actuated mechanism for discharging the tank, as set forth.

4. A flushing apparatus comprising, in combination, a tank, an air bound siphon communicating therewith, a discharge pipe communicating with said siphon and comprising a liquid trap, automatic means for recharging the tank and for preventing the liquid from discharging from the tank and to obtain an after-flow of liquid from the discharge pipe after the tank has been discharged and during the operation of refilling the tank, float actuated means for discharging the tank, and means actuated by the float for admitting and maintaining the supply of liquid to the tank during the discharge and recharge of the latter, as set forth.

5. A flushing apparatus comprising, in combination, a tank, an air bound siphon communicating therewith, a discharge pipe communicating with said siphon and comprising a liquid trap, automatic means for recharging the tank and for preventing the liquid from discharging from the tank and to obtain an after-flow of liquid from the discharge pipe after the tank has been discharged and during the operation of refilling the tank, a float pivotally mounted within the tank, and means actuated by the float for allowing liquid to refill the tank while the float is lowering and returning to its normal position, as set forth.

6. A flushing apparatus, comprising, in combination, a tank, an air bound siphon communicating therewith, a discharge pipe communicating with said siphon and comprising a liquid trap, automatic means for recharging the tank and for preventing the liquid from discharging from the tank and to obtain an after-flow of liquid from the discharge pipe after the tank has been discharged and during the operation of refilling the tank, a float covering substantially the surface of the liquid in the tank, and a valve supply pipe regulated by the movement of said float, as set forth.

7. A flushing apparatus comprising a tank, a discharge pipe communicating therewith and forming a liquid trap, a fixed bell positioned over and about the upper end of the discharge pipe and coöperating with the latter to form an air bound siphon, a float mounted within the tank, an intake, means actuated by the float for controlling the intake, and means for actuating the float, as set forth.

8. A flushing apparatus comprising a tank, a discharge pipe communicating therewith and forming a liquid trap, a fixed bell positioned over and about the upper end of the discharge pipe and coöperating with the latter to form an air bound siphon, a float mounted within the tank, an intake, means actuated by the float for controlling the intake, a rock shaft, a projection thereon adapted to actuate said float, and means for rocking the shaft, as set forth.

9. A flushing apparatus comprising a tank, a discharge pipe communicating therewith and forming a liquid trap. a fixed bell positioned over and about the upper end of the discharge pipe and coöperating with the latter to form an air bound siphon, a float mounted within the tank, an intake, means actuated by the float for controlling the intake, a rock shaft, a projection thereon adapted to actuate said float, and a counterbalanced handle fixed to said shaft, as set forth.

In testimony whereof I hereunto affix my signature in the presence of two witnesses.

HARMON D. MOISE.

Witnesses:
A. L. HOUGH,
FRANKLIN N. HOYT.